United States Patent [19]

Pinaire

[11] 4,312,625
[45] Jan. 26, 1982

[54] HYDROGEN COOLED TURBINE

[75] Inventor: Lonnie W. Pinaire, Prospect, Ky.

[73] Assignee: The United States of America as represented by the Secretary of the Air Force, Washington, D.C.

[21] Appl. No.: 832,505

[22] Filed: Jun. 11, 1969

[51] Int. Cl.² ............................................. F01D 5/18
[52] U.S. Cl. ................................. 416/96 R; 415/178
[58] Field of Search ......................... 416/95 R, 96 R; 60/39.66; 415/178

[56] References Cited

U.S. PATENT DOCUMENTS

| 2,635,805 | 4/1953 | Baumann | 416/96 |
| 2,667,326 | 1/1954 | Ledinegg | 416/96 |
| 2,778,601 | 1/1957 | Eckert | 416/96 |
| 2,783,613 | 3/1957 | Von Zborowski | 416/95 |
| 3,297,301 | 1/1967 | Petrie et al. | 416/95 |
| 3,358,457 | 12/1967 | Caldwell et al. | 60/39.66 |

FOREIGN PATENT DOCUMENTS 742476 12/1955 United Kingdom ................. 416/96

Primary Examiner—Stephen C. Bentley
Attorney, Agent, or Firm—Donald J. Singer; Jacob N. Erlich

[57] ABSTRACT

A bladed rotor for a turbine having a rotor disk and a plurality of blades. The blades contain a plurality of passages therein for circulating a hydrogen coolant in order to cool the blade. In order to prevent leakage of the hydrogen the blade is electron welded onto the rotor disk.

7 Claims, 6 Drawing Figures

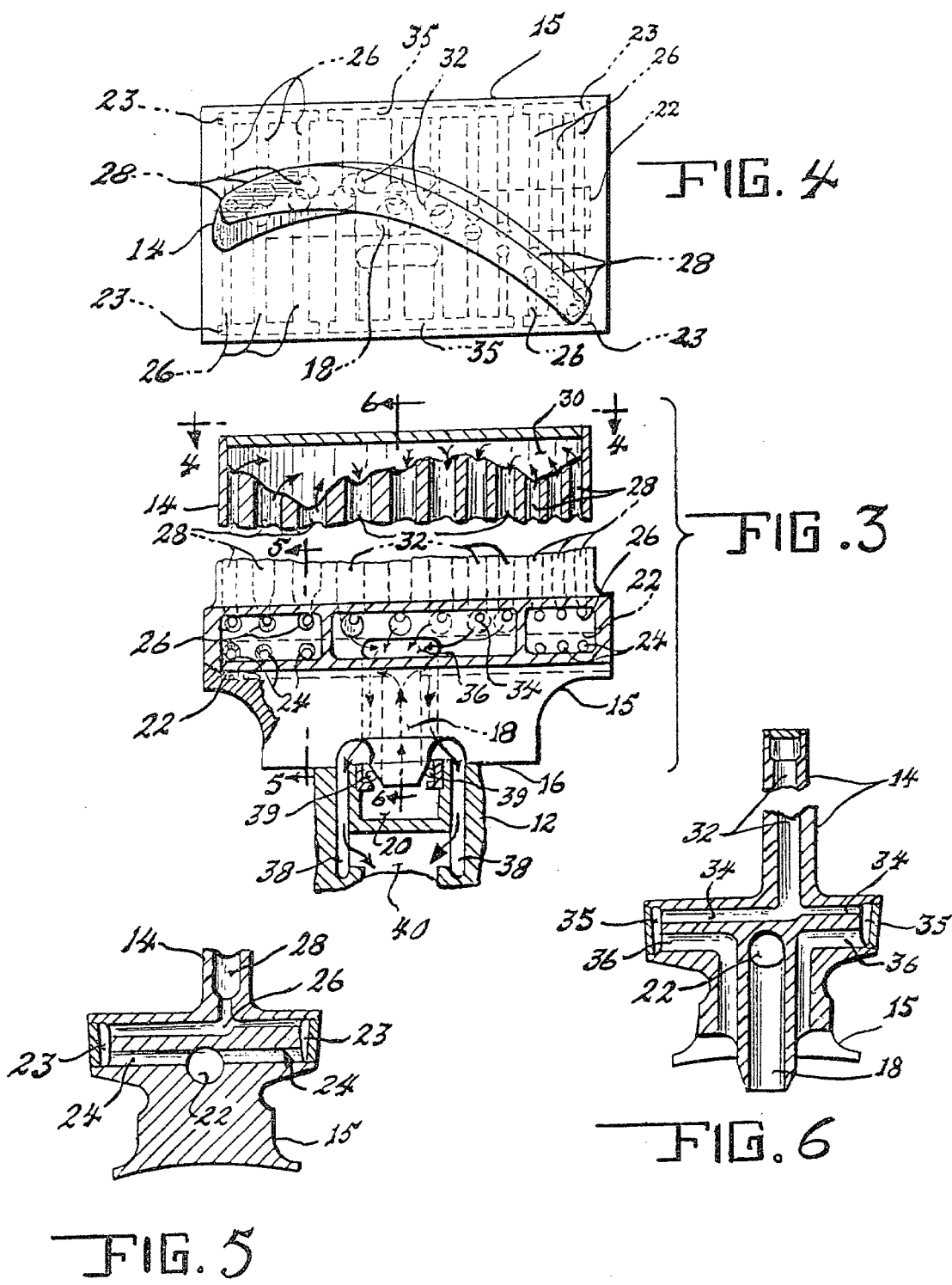

HYDROGEN COOLED TURBINE

BACKGROUND OF THE INVENTION

This invention relates generally to turbine apparatus, and more particularly to an improved gas turbine blade construction having means for hydrogen cooling the blade.

In a conventional gas turbine engine generally comprising an air compressor, combustion products generation means, a turbine wheel, and a duct connecting these elements in serial fluid flow relation, the high temperature of the combustion products calls for the use of cooling means for the turbine wheel. The cooling means conventionally comprises a conduit receiving air bled from the compressor and conveying it to the turbine wheel, the conduit being spaced from the duct for the combustion products to minimize heat exchange therewith. The engines of the above-mentioned type are complicated and expensive to construct and maintain. They are also open to the objection that parts frequently fail due to high stresses resulting from wide differences in expansion and contraction, particularly during the transient phases of operation.

Furthermore, the continued development of hypersonic propulsion engines is leading toward the use of hydrogen fuel and stoichiometric combustion temperatures. Due to material limitations, engine components exposed to these high temperature environment must be cooled. Cooling the turbine presents unique problems in that the cooling system must operate in a high centrifugal field.

As heretofore mentioned the use of air for cooling the turbine has been the technique utilized to date. However, as temperatures increase greater percentages of air must be extracated from the cycle for cooling purposes which tends to decrease overall cycle performance.

SUMMARY OF THE INVENTION

In order to overcome the problems set forth above, the instant invention sets forth the use of convective cooling of the static components with hydrogen. The use of hydrogen especially enhances the performance of hypersonic engines. The nature of hydrogen, however, imposes severe limitations on distribution and containment procedures heretofore in use. Mechanical-type joints in the hydrogen system of this invention are avoided wherever necessary to minimize the chance of leakage. The instant invention establishes a flight-type system for distributing and containing the hydrogen in a rotating component for cooling purposes. More particularly, this invention pertains to a turbine that contains internal passages for cooling that has no external mechanical joints subject to leakage.

The blades of the turbine are integrally attached to the disk of the turbine by the electron beam welding technique along the fore and aft edges. The welds are located in a manner to isolate them from the tangential stress field so that only centrifugal forces are experienced. Sheet metal caps are welded between the blade shanks and to the disk to form a pressure-tight leakage-proof cavity system. Hydrogen is supplied to the turbine through a single cylindrical manifold at the center of the disk from which it is routed to a circumferential manifold adjacent the periphery of the rim through a series of radial holes. The hydrogen is distributed circumferentially to ports that open to a supply passage in each blade.

A mechanical seal is incorporated to seal between the supply and return manifolds. The seal is designed in a manner to isolate it from absorbing operating loads. Although leakage across this seal into the return system is not critical, it is desirable to minimize the amount to assure maximum coolant flow through the blades. This is accomplished by design of a dual seal that is energized by both centrifugal loads and coolant pressures.

The hydrogen is routed through the blades to provide convective cooling for the tip of the blade as well as the base portion. The hydrogen is collected at the edges of the tip and routed back through the blade shank through a plurality of apertures and to the circumferential return manifold. This manifold surrounds the supply manifold and is symmetrical about the disk. The hydrogen travels circumferentially to openings under the supply manifold. These openings route the hydrogen to radial passages which are connected to an annular return manifold in the hub of the disk.

It is therefore an object of this invention to provide a gas turbine engine having a novel turbine disk and blade construction and means for applying hydrogen as a cooling fluid thereto in order to decrease the tendency of the wheel to fail because of stresses resulting from rapid, unequal, or localized expansion.

It is another object of this invention to provide a blade-to-disk integral attachment that functions effectively as a load carrying joint and a leak-proof fuel system joint thereby eliminating external mechanical joints and tubing that otherwise would be operating in a high centrifugal field.

It is a further object of this invention to provide a novel means for routing the coolant in and out of the blade to provide for convective cooling of the platform.

It is still another object of this invention to provide a turbine construction which utilizes conventional, currently available components that lend themselves to standard mass-producing manufacturing techniques.

For a better understanding of the present invention, together with other and further objects thereof, reference is made to the following description taken in connection with the accompanying drawing and its scope will be pointed out in the appended claims.

DESCRIPTION OF THE DRAWING

FIG. 3 is a cross sectional view of the turbine blade of this invention;

FIG. 4 is a top view along line 4—4 of FIG. 3;

FIG. 5 is taken along line 5—5 of FIG. 3; and

FIG. 6 is taken along line 6—6 of FIG. 3.

DESCRIPTION OF THE PREFERRED EMBODIMENT

Figure 1:
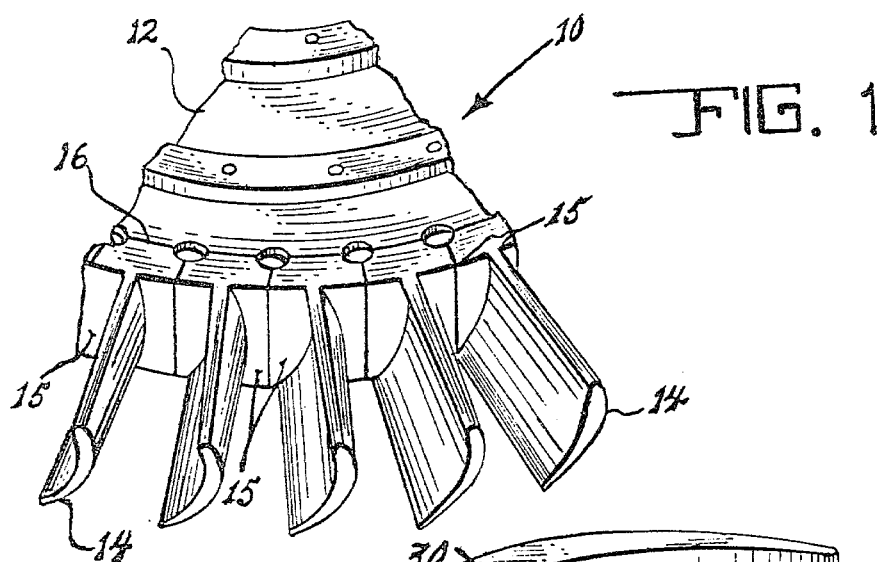
FIG. 1 is a perspective view of the turbine blade and disk of this invention.

Referring to FIG. 1 of the drawing, reference numeral 10 designates the turbine disk 12 and blades 14 of this invention. The disk 12 is drivably connected to the shaft of a turbine in a conventional manner (not shown).

The turbine disk 12 has an outer periphery 16. A plurality of circumferentially-spaced blades 14 are secured to the periphery 16 of the disk 12 by any suitable securing method such as electron welding. The blades 14 extend radially outwardly from the periphery 16, as illustrated best in FIG. 1. The turbine motive fluid flows axially between the turbine blades 14 and coacts with the blades to drive the turbine disk 12. In a conventional gas turbine engine, the turbine disk drives an air compressor which in turn supplies compressed air to the turbine combustion chamber and the hot gases discharging from the chamber constitute the turbine motive fluid.

Reference is now made to FIG. 3 wherein it is shown that each blade base portion 15 contains therein a centrally located passageway 18 for carrying the cooling fluid medium to the blade 14. The cooling medium utilized in the instant invention is hydrogen which is supplied to passageway 18 through an annular supply manifold 20 within disk 12. The cooling medium flows from passageway 18 to a horizontal passageway 22 located perpendicular to passageway 18 within base portion 15. Passageway 22 is shown clearly in FIGS. 3-6.

Figure 2:
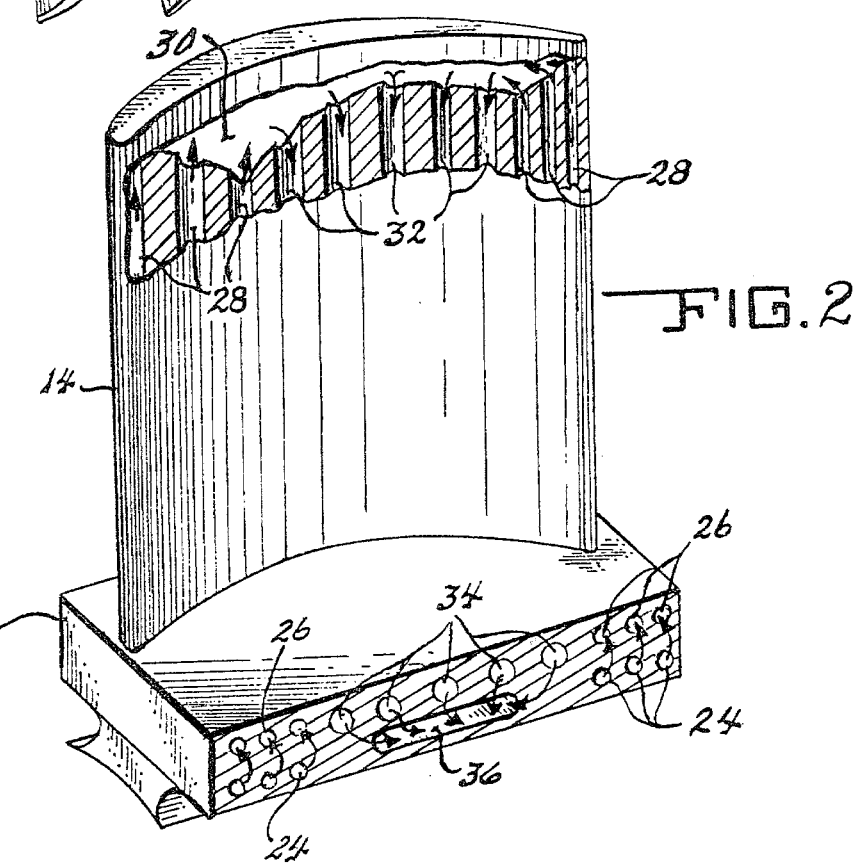
FIG. 2 is a fragmentary view of the turbine blade of this invention shown partially in cross section.

Referring in particular to FIGS. 2, 3 and 5, there are any suitable number of (such as twelve) apertures 24 located in the lower part of base portion 15 (three on each side near the leading and trailing edges) that connect supply passageway 22 with cavities 23 on each side of base portion 15. The cavities 23 join with a plurality of apertures 26 located in the upper part of base portion 15. Each aperture 26 from one side of base portion 15 joins with an aperture 26 from the other side forming a plurality of single passages (six) 28 within blade 14. The passages 28 and the apertures 26 in the upper part of base portion 15 can be seen clearly in FIGS. 4 and 5.

As shown in FIG. 2, the cooling medium (hydrogen) discharges into blade tip cavity 30. Flow in the cavity 30 cools the blade tip and the cavity 30 reroutes the coolant into return passages 32. The tip cavity 30 is contoured to provide a controlled velocity distribution for evenly distributing the return flow to the return passages 32. Referring to FIGS. 3 and 6, the return passages 32 deliver the cooling medium to a plurality of apertures 34 on both upper sides of base portion 15 (see FIGS. 4 and 6). Flow cavities 35 receive the flow from apertures 34. At the bottom of the base portion 15 a slot 36 (on each side) receives the cooling medium from cavities 35 and conducts it into the return circumferential manifold 38 located on either side of the supply manifold 20 in the disk 12, from which it is returned to the center of the disk 12 through passageway 40 (see FIG. 3). The supply manifold 20 being separated from the return manifold 38 by any suitable seal such as mechanical seal 39.

As shown in FIGS. 2 and 3, the blade tip cavity 30 is that hollow portion of the blade 14 in which the upward coolant flow is turnd 180° with minimum pressure drop and directed to the downward coolant passages 32. It is desirable to turn the flow with a substantial velocity so as to provide coolant coefficients of ample magnitude to cool the blade at the tip. The tip is therefore contoured in such a manner as to turn the flow at high velocity with a minimum pressure loss. The objective set forth in establishing the blade coolant routing of this invention is to keep the maximum metal temperature at or below a limit (for example, 1350° F.) without employing any additional coolant over that amount which was necessary to cool the blade 14. That is to say, all the coolant which passes up and down the bucket must be sufficient to cool the blade.

The turbine disk 12 of this invention incorporates an integral cooling system with hydrogen as the cooling medium. The joints of the above system therefore must be leak-proof. The best method of securing the blades 14 to the disk 12 is an electron welding procedure at the periphery 16. Such a procedure has excellent strength and weld efficiency.

MODE OF OPERATION

Hydrogen is introduced from a supply manifold 20 to the blade 14 through a circular passageway 18. The coolant proceeds through the passageway 18 to a central horizontal passageway 22 running in a general chordwise direction. In the lower part of the base portion 15 there are twelve apertures 24 (three on each side near the leading and the trailing edges) that connect the supply passageway 22 with cavities 23 on each side of the base portion 15. From the upper part of the side cavities 23, twelve apertures 26 (three near each corner of the base 15) run to central passage 28. The passages 28 supply the required flow to the blade 14 and provide cooling. The coolant flows through six of the passages 28 in blade 14 to the tip of cavity 30. The blade tip cavity 30 is contoured to provide a controlled velocity distribution for evenly distributing the return flow to the five return passages 32 in the center part of the blade 14. At the upper part of the base 15 ten horizontal apertures 34 connect to return flow cavities 35 at the edges of the base 15. At the bottom of each cavity 35, a slot 36 conducts the coolant into the return circumferential manifold 38 located on either side of the supply manifold 20 in the periphery portion of the disk 12 from which it is returned to the center of the disk 12 through passageway 40.

Although the invention has been described with reference to a particular embodiment, it will be understood to those skilled in the art that the invention is capable of a variety of alternative embodiments within the spirit and scope of the appended claims:

I claim:

1. A bladed rotor for a turbine comprising a rotor disc having an outer periphery, at least one rotor blade having a base portion, said blade base portion being fixedly secured to the periphery of said disc, said base portion having a first centrally located passageway, said disc having an annular supply manifold containing a coolant operably associated with said centrally located passageway, a second passageway located within said base portion perpendicular with and connected to said centrally located passageway, a plurality of apertures located within said base portion perpendicular with and connected to said second passageway, a first plurality of passages within said blade connected to said apertures for supplying said coolant to said blade and a second plurality of passages within the central portion of said blade adjacent said first passages for returning said coolant to a return manifold in said disc, whereby coolant from said first plurality of passages is turned 180° and directed downward through said centrally located second plurality of passages.

2. A bladed rotor as defined in claim 1 wherein said coolant is hydrogen.

3. A bladed rotor as defined in claim 1 wherein said blade base portion is electron welded to said disk.

4. A bladed rotor as defined in claim 3 wherein said coolant is hydrogen.

5. A bladed rotor as defined in claim 4 wherein a cavity connects said first and second plurality of passages, said cavity being contoured in such a manner as to turn the coolant flow at a high velocity with a minimum pressure drop.

6. A bladed rotor as defined in claim 5 wherein said return manifold is located on either side of said supply manifold.

7. A bladed rotor as defined in claim 6 wherein said supply manifold is separated from said return manifold by a mechanical seal.

* * * * *